United States Patent
Rang et al.

(10) Patent No.: US 8,094,069 B2
(45) Date of Patent: Jan. 10, 2012

(54) METHOD FOR INCREASING THE AVAILABILITY OF A GLOBAL NAVIGATION SYSTEM

(75) Inventors: Tanja Rang, Grasbrunn (DE); Hans L. Trautenberg, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 188 days.

(21) Appl. No.: 12/525,964

(22) PCT Filed: Feb. 1, 2008

(86) PCT No.: PCT/DE2008/000181
§ 371 (c)(1),
(2), (4) Date: Feb. 12, 2010

(87) PCT Pub. No.: WO2008/095468
PCT Pub. Date: Aug. 14, 2008

(65) Prior Publication Data
US 2010/0141511 A1 Jun. 10, 2010

(30) Foreign Application Priority Data
Feb. 6, 2007 (DE) .................. 10 2007 006 612

(51) Int. Cl.
*G01S 19/20* (2010.01)

(52) U.S. Cl. .................................. 342/357.58

(58) Field of Classification Search ............ 342/357.58
See application file for complete search history.

(56) References Cited

U.S. PATENT DOCUMENTS

| | | | |
|---|---|---|---|
| 5,808,581 A * | 9/1998 | Braisted et al. | 342/357.58 |
| 5,841,399 A | 11/1998 | Yu | |
| 5,969,672 A | 10/1999 | Brenner | |
| 6,515,618 B1 * | 2/2003 | Lupash | 342/357.29 |
| 7,436,354 B2 * | 10/2008 | Lee | 342/357.29 |
| 2003/0011511 A1 * | 1/2003 | King et al. | 342/357.02 |
| 2005/0015680 A1 * | 1/2005 | Rubin et al. | 714/47 |
| 2006/0152409 A1 * | 7/2006 | Raman et al. | 342/357.15 |
| 2009/0234581 A1 * | 9/2009 | Levy et al. | 701/214 |

FOREIGN PATENT DOCUMENTS

| | | |
|---|---|---|
| DE | 197 31 103 A1 | 1/1999 |
| EP | 1 637 899 A1 | 3/2006 |

OTHER PUBLICATIONS

Curtis Shively, "Satellite Criticality Concepts for Unavailability and Unreliability of GNSS Satellite Navigation", XP-002483838, Sep. 22, 1993, pp. 575-589.

(Continued)

*Primary Examiner* — Harry Liu
(74) *Attorney, Agent, or Firm* — Crowell & Moring LLP (57) ABSTRACT

A process for increasing the availability of a global navigation system that includes a plurality of spacecraft, each of which transmits information for determining the position of a terminal. From the plurality of spacecraft, a first subset, with at least one spacecraft, and a second subset are determined, the second subset being constituted by those spacecraft that are not included in the first subset. The integrity risk is determined for the information transmitted only by the second spacecraft. The first and the second subsets of spacecraft are determined such that the integrity risk, for information transmitted by the second subset spacecraft minimized relative to the integrity risk for information of all spacecraft included in the plurality of spacecraft.

12 Claims, 6 Drawing Sheets

OTHER PUBLICATIONS

Veit Oehler et al., "User Integrity Risk Calculation at the Alert Limit without Fixed Allocations", XP-002375519, ION GNSS 17th International Technical Meeting of the Satellite Division, Sep. 21, 2004, pp. 1645-1652.

International Search Report dated Jun. 27, 2008 with partial English translation (Seven (7) pages).
Form PCT/ISA/220 and Form PCT/ISA/237 dated Jun. 27, 2008 with partial English translation (Fourteen (14) pages).

* cited by examiner

METHOD FOR INCREASING THE AVAILABILITY OF A GLOBAL NAVIGATION SYSTEM

This application is a national stage of International Application No. PCT/DE2008/000181, filed Feb. 1, 2008, which claims priority under 35 U.S.C. §119 to German Patent Application No. 10 2007 006 612.2, filed Feb. 6, 2007, the entire disclosure of which is herein expressly incorporated by reference.

BACKGROUND AND SUMMARY OF THE INVENTION

The invention relates to a process for increasing the availability of a global navigation system comprising several spacecraft, each of which transmits information to a terminal for the purpose of determining its position. The invention also relates to a terminal for determining a position while using a global navigation system.

In a global satellite navigation system, the precise determination of a specified position with respect to the earth requires both local and global integrity of information transmitted to the terminal by a plurality of satellites. On the one hand, integrity is the ability of the global navigation system to warn a user (i.e., the terminal), within a predefined time, when parts of the system should not be used for the intended purpose. On the other hand, integrity is also the trust a user can have in the reliability of the information which he receives from the navigation system. In particular, this relates to the accuracy of the information.

Warnings are required, for example, when individual satellite or navigation position determination signals have errors. Such errors occur, for example, when a navigation signal of a satellite was generated at the wrong time (so-called "clock or time correction error") or was created at a faulty location (so-called "faulty satellite orbit"). These errors may influence the actual propagation time of a signal from the satellite to the terminal and may therefore exert a strong influence on the precision of the navigation.

In order to minimize a measuring error during position determination by the terminal, in the case of the known global Galileo navigation system, the information of all satellites from which the terminal receives information will be processed. This approach is based on the assumption that, as a result of a maximum number of measurements which can in each case be performed based on the information transmitted by the respective satellites, an error in the position determination can be minimized. Here, it is an existing secondary condition that at most six of the satellites are permitted to be critical satellites. A critical satellite is defined as a satellite whose information is necessary for position determination, in order to leave an integrity risk below a predefined threshold value (a so-called tolerable or allocated integrity risk). For this reason, the terminal has a function for determining the number of critical satellites in a terminal geometry. Terminal geometry (also: user geometry) refers to the taking-into-account of those satellites whose information is to be used for the position determination.

Because of the large number of satellites to be taken into account in practice (in the case of Galileo, as a rule, 11 satellites) and because of the predefined specification of a maximum of six allowed critical satellites, there is a super-proportionally high degree of unavailability of its global navigation system in practice.

It is therefore an object of the present invention to provide a process for increasing the availability of a global navigation system which comprises several spacecraft each of which transmits information to a terminal for the purpose of determining its position. It is also an object of the present invention to provide a terminal which determines its position using a global navigation system.

These and other objects and advantages are achieved by the process according to the invention, in which information is in each case transmitted to the terminal by a plurality of spacecraft. From the plurality of spacecraft, a first subset (with at least one spacecraft) and a second subset are determined, with the second subset being constituted by those spacecraft which are not included in the first subset. An integrity risk is then determined based only on information transmitted by the second subset of spacecraft. The first and the second subsets of spacecraft are determined ultimately such that the integrity risk associated with the information transmitted by the second subset of spacecraft is optimized relative to the integrity risk associated with the information of all spacecraft included in the plurality of spacecraft.

The terminal according to the invention, which determines its position using a global navigation system, comprises devices for carrying out the process according to the invention.

The invention is based on a recognition that the accuracy of the position determination of the terminal does not depend on the number of available measurements which can in each case be carried out from the information transmitted by the respective spacecraft. On the contrary, a high degree of accuracy of the position determination can also be achieved from a smaller number of measurements. However, by using a smaller number of spacecraft for a position determination, and by optimizing the integrity risk, the availability of the navigation system can also be increased.

In this case, the optimization, on the one hand, takes into account the need to maintain the integrity risk below a predetermined tolerable value, and/or the need to maintain the number of critical spacecraft below a predefined maximum number of critical spacecraft, on the other hand. The optimization with respect to the integrity risk and/or the number of critical satellites can be achieved for a position determination by eliminating from consideration those spacecraft whose information results either in an increased integrity risk or in an increased number of critical spacecraft. Accordingly, in an optimization process, spacecraft (from among those from which the terminal receives information) are therefore allocated to the first subset (which should not be used for position determination), and to the second subset (based on which the position determination should finally take place). Only the information of the second subset of spacecraft is used to determine the position of the terminal. Thus, information from the first subset of spacecraft is not used for this purpose.

According to an embodiment of the invention, the first subset and the second subset of spacecraft are determined iteratively, so that the integrity risk determined from information transmitted by the second spacecraft, is minimized relative to the integrity risk that was determined from information of all spacecraft the plurality of spacecraft.

To minimize integrity risk, a number of spacecraft from the plurality of spacecraft are allocated to the first subset, and the integrity risk of the second spacecraft remaining in the second subset is determined. This step is repeated for all possible combinations of a first subset. In principle, the number of spacecraft may be arbitrary. It is advantageous to carry out first the iteration with the number "1". Should this not result in any significant reduction of the integrity risk, the iteration can be repeated, for example, for a number "2". This approach can be arbitrarily expanded. Those second spacecraft of the second subset where the integrity risk is minimal form the plurality of spacecraft for a next iteration step. The above-mentioned steps are repeated until a minimum integrity risk has been reached. By means of the above-mentioned process steps, those spacecraft are successively excluded from a measurement for determining the position of the terminal which contribute to the greatest reduction of the integrity risk.

In this case, a further embodiment of the invention determines whether the integrity risk resulting from the successive removal of at least one spacecraft is lower than a tolerable integrity risk. If so, the navigation system will be available.

According to a further embodiment, it is determined for each of the second spacecraft (of the second subset) whether it is a critical spacecraft. In this case, it is to be checked whether the number of critical spacecraft is greater than a number of allowed critical spacecraft. If so, it is attempted according to a further embodiment of the invention to reduce the number of the critical satellites to a tolerable number.

To minimize the number of critical spacecraft, a non-critical spacecraft from the determined (particularly, optimal) second subset of spacecraft is allocated to the first subset. This means that the non-critical spacecraft is at first excluded from the measurements. Then the number of critical spacecraft is determined within the remaining second subset. These steps are iteratively repeated until no more non-critical spacecraft can be determined in the second subset. This approach is based on the consideration that also the number of critical spacecraft may change positively as a result of the further removal of a non-critical spacecraft. If no other non-critical spacecraft can be removed from the second subset and if, after checking the number of the critical subset, the number of critical spacecraft has not fallen below a predefined value, the optimization will come to an end at this point.

The number of critical spacecraft is advantageously minimized when the number of critical spacecraft is greater than a maximum permitted number of critical spacecraft.

The invention further comprises a computer program product which can be loaded directly into the internal memory of a digital computer, including software code sections by means of which the steps of the process according to the invention can be carried out when the product is running on a computer.

Other objects, advantages and novel features of the present invention will become apparent from the following detailed description of the invention when considered in conjunction with the accompanying drawings.

DETAILED DESCRIPTION OF THE DRAWINGS

Figure 1:
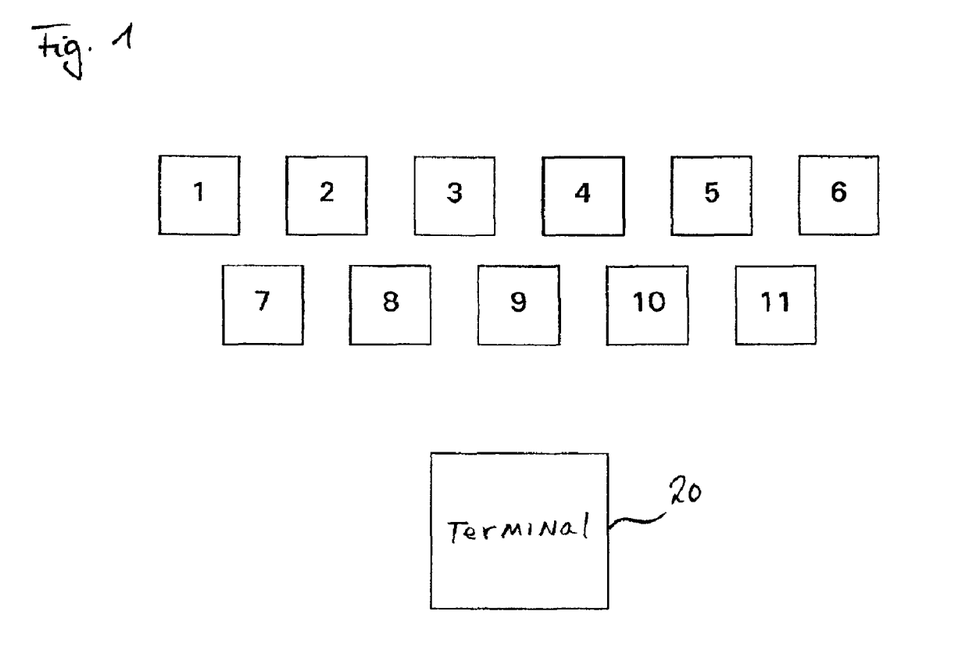
FIG. 1 is a schematic representation of a global navigation system with, for example, eleven spacecraft which each transmit information to a terminal to determine its position.

FIG. 1 illustrates a global navigation system with, for example, eleven spacecraft 1, 2, . . . , 11, each of which transmits information to a terminal 20. The terminal 20 is capable of carrying out a position determination from the information transmitted by the spacecraft 1, 2, . . . , 11. In the following, the spacecraft will be called satellites.

In the process according to the invention, information from less than all of the satellites 1, 2, . . . , 11 available in principle is used for position determination; in particular, a number of satellites that is optimized with respect to the integrity risk and with respect to the number of critical satellites is used for this purpose. It is first attempted to identify those satellites whose removal will lead to an improvement of the integrity risk. For this purpose, the integrity risk is first determined based on the information of all satellites 1, 2, . . . , 11.

Satellites whose information is not used to determine the position of the terminal 20 in the further course are considered to be allocated to a first subset. Satellites which, in contrast, are used for the position determination are considered to be allocated to a second subset of satellites. In the FIGS. 2 to 5 described in the following, satellites of the first subset will be illustrated by a broken line. In contrast, satellites allocated to the second subset will be shown by a continuous line.

Figure 2:
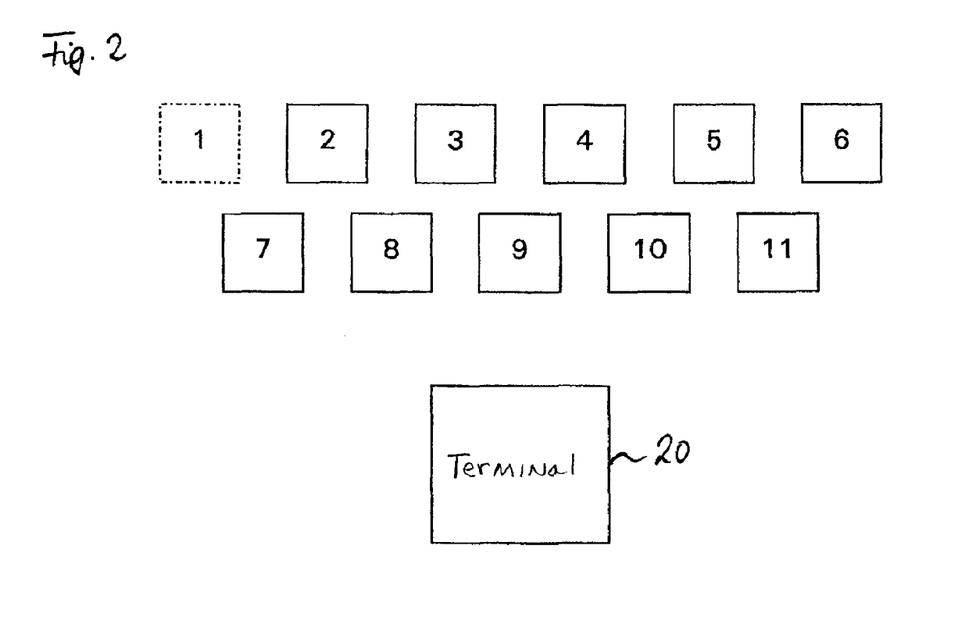
FIGS. 2 to 10 show respective conditions of the global navigation system during implementation of the process according to the invention.
Figure 3:
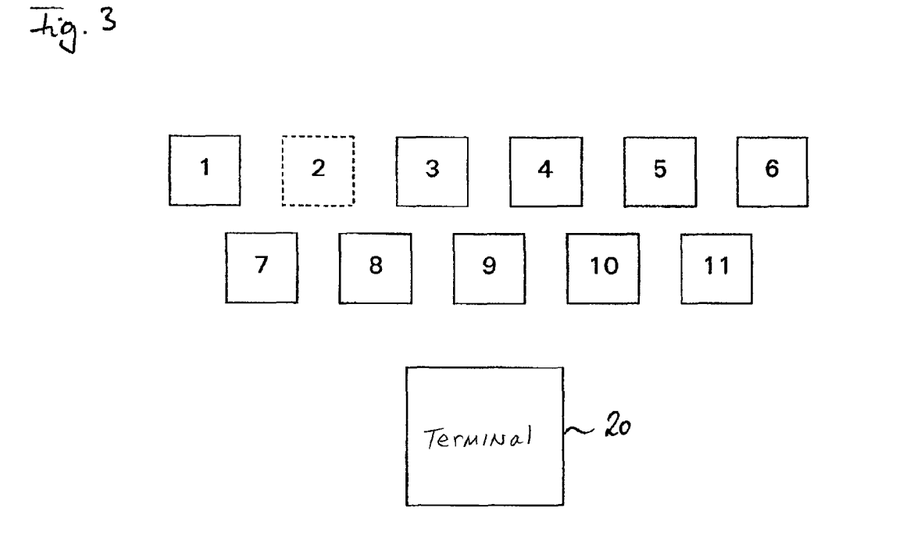

In a first step, satellite (1) out of the total number of eleven is allocated to the first subset. In FIG. 2, the integrity risk is determined initially for satellites 2, . . . 11 allocated to the second subset, and the extent is determined to which the integrity risk is reduced by the removal of satellite 1 (compared to the integrity risk determined for the totality of the plurality of satellites 1, 2, . . . 11).

Figure 4:
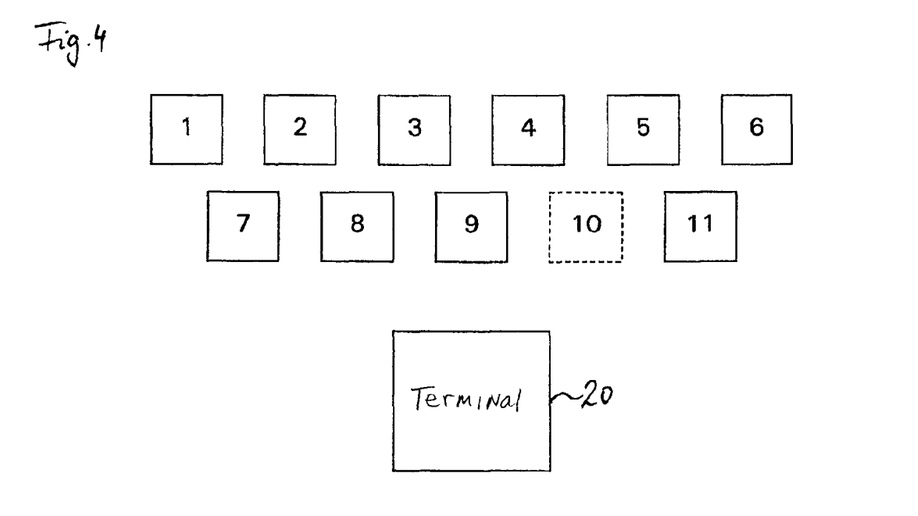
Figure 5:
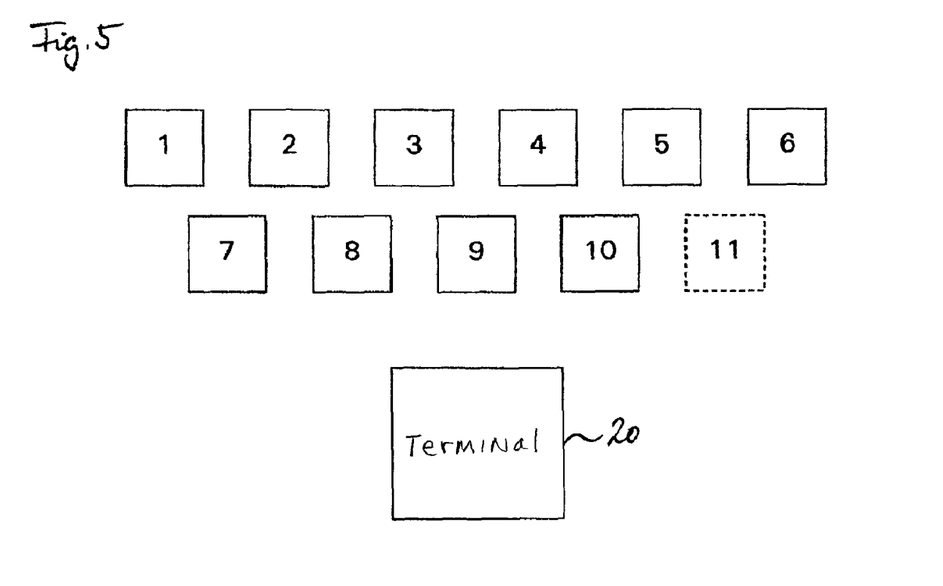

This procedure is repeated in a corresponding manner for the other satellites. Thus, according to FIG. 3, satellite 2 is allocated to the first subset, and the integrity risk is determined for ten satellites 1, 3, 4, . . . , 11 remaining in the second subset. This operation is repeated in a corresponding manner for satellites 3, 4, 5, 6, 7, 8, 9, 10 and 11, which is illustrated in FIGS. 4 and 5 as an example for satellites 10 and 11.

Within the scope of the first step, the integrity risk was determined for all eleven possible combinations for the removal of one of the eleven satellites. In the example, it is assumed that the integrity risk could be reduced the most by the removal of satellite 2. For further consideration, therefore, the removal of satellite 2 from the plurality of the eleven satellites is final. This is symbolized by the striking-out of satellite 2. Satellite 2 is thereby added to the first subset, while the second subset is formed by the satellites 1, 3, 4, 5, 6, 7, 8, 9, 10 and 11. This is schematically illustrated in FIG. 6.

Figure 6:
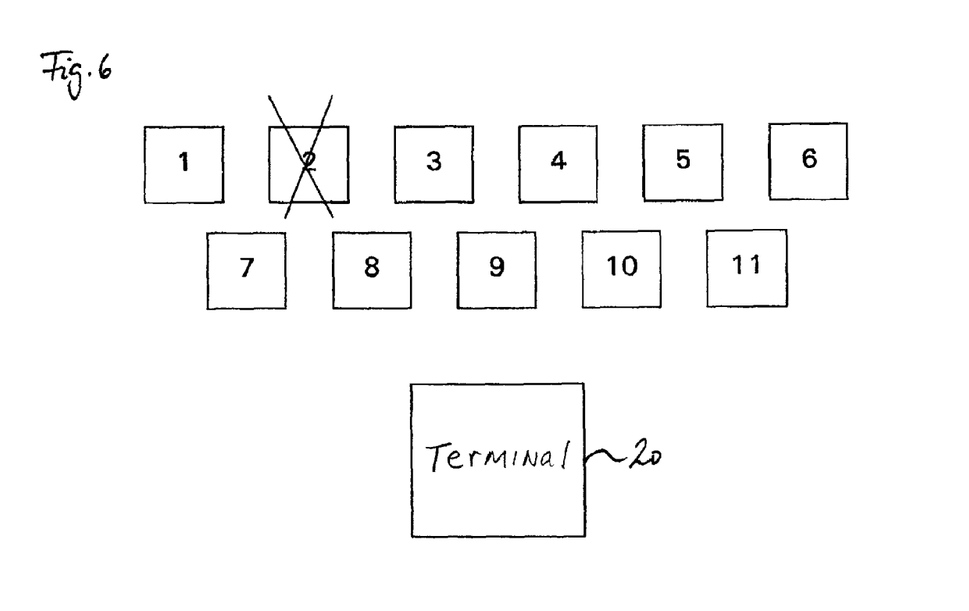

In a second iteration step, the second subset illustrated according to FIG. 6 forms the plurality of satellites. This means that the same procedure as described in FIGS. 2 to 5 is repeated for the remaining ten satellites 1, 3, 4, 5, 6, 7, 8, 9, 10 and 11. In this case, it is determined, for example, that, as a result of the further removal of satellite 10 maximizes the reduction of the integrity risk. Satellite 10 is therefore added to the first subset. This is symbolized by the striking-out of satellite 10. Satellites 1, 3, 4, 5, 6, 7, 8, 9 and 11 therefore remain in the second subset.

Figure 7:
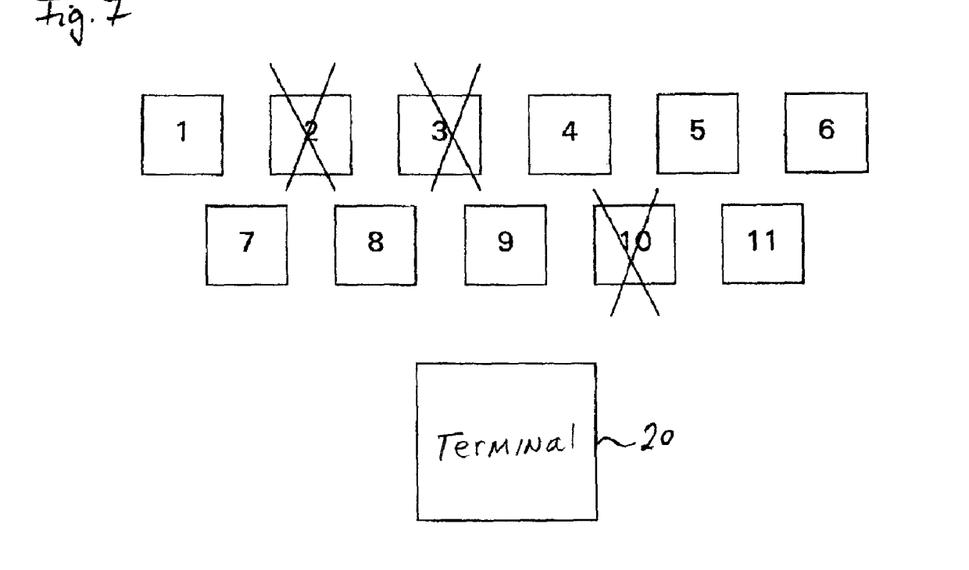

In a third iteration loop, the described procedure is repeated. In the embodiment, it is assumed that a further maximum reduction of the integrity risk can be achieved by the removal of satellite 3, which is therefore also added to the first subset. Satellites 1, 4, 5, 6, 7, 8, 9 and 11, whose information is to be used for the position determination for the terminal 2, therefore remain in the second subset. This is schematically illustrated in FIG. 7.

Three iteration steps of the described type are carried out in the embodiment. In practice, more or fewer iteration steps may also take place.

Figure 8:
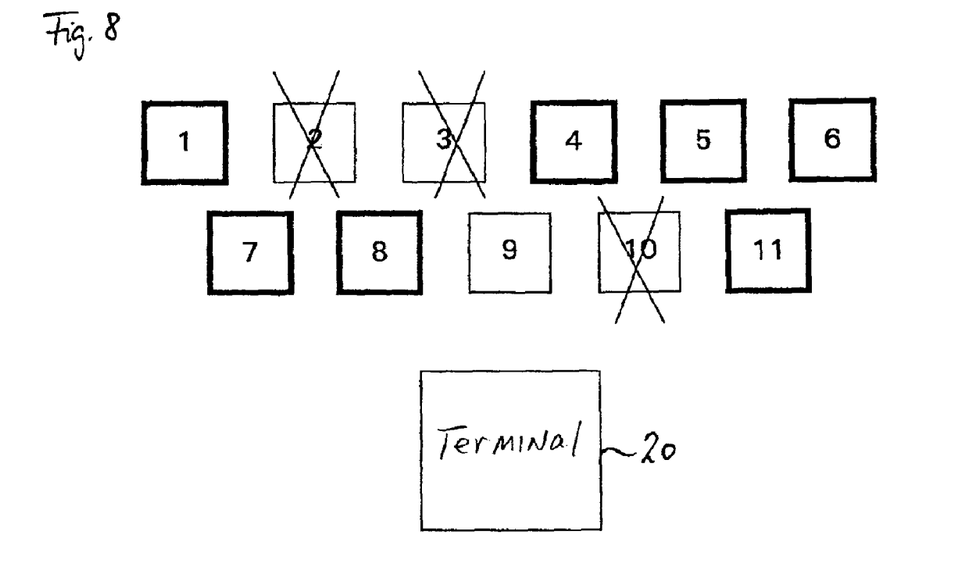

It is assumed here that the integrity risk determined by using the information of satellites 1, 4, 5, 6, 7, 8, 9 and 11, is below a tolerable integrity risk. It is therefore further checked for each of satellites 1, 4, 5, 6, 7, 8, 9 and 11 whether it is a critical satellite. In FIG. 8, critical satellites are illustrated by means of a bold continuous line. As easily visible in FIG. 8, satellites 1, 4, 5, 6, 8 and 11 represent critical satellites, while satellite 9 is a non-critical satellite. In this case, the term "Critical satellite" means that removal of a critical satellite from the remaining second subset, causes the integrity risk of the remaining satellites to rise again over the tolerable integrity risk.

Furthermore, it is checked whether the number of critical satellites is greater than a predefined maximally tolerated number of critical satellites. In the embodiment, it is assumed that the number of maximally tolerable critical satellite is six. (In practice, this number may deviate from the selected value.) As is easily visible in FIG. 8, the navigation system in the embodiment has a total of seven critical satellites.

It is therefore further checked whether the second subset also contains non-critical satellites. In the embodiment according to FIG. 8, satellite 9 represents a non-critical satellite. The latter is therefore removed from the second subset and allocated to the first subset. It was found that, as a result of the described strategy, the number of critical satellites can also be influenced.

Satellites 1, 4, 5, 6, 7, 8 and 11 now remain in the second subset. The integrity risk is determined again, and a further determination is made for each of these satellites whether it is a critical satellite. In the illustrated example, satellite 4 has now become a non-critical satellite as a result of the removal of satellite 9. (See FIG. 9.) Satellites 1, 5, 6, 7, 8 and 11 remain as critical satellites.

Figure 9:
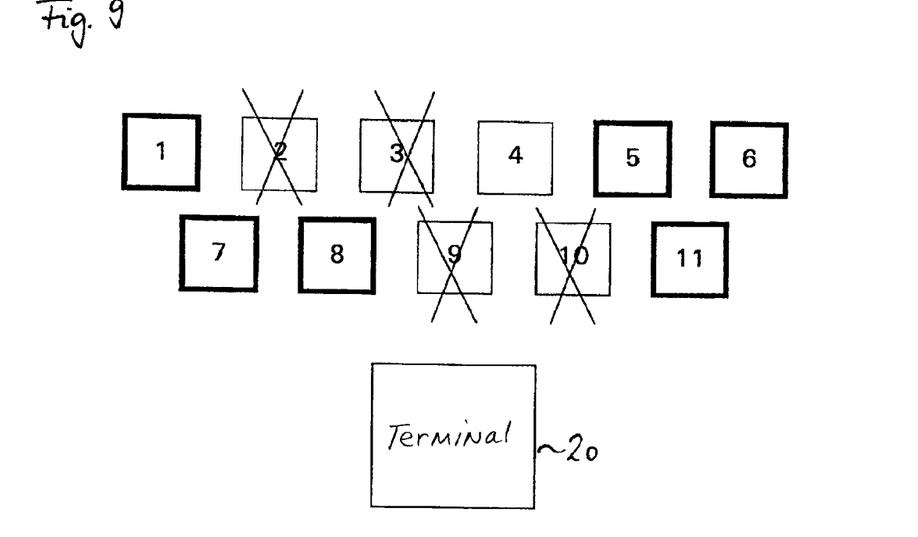
Figure 10:
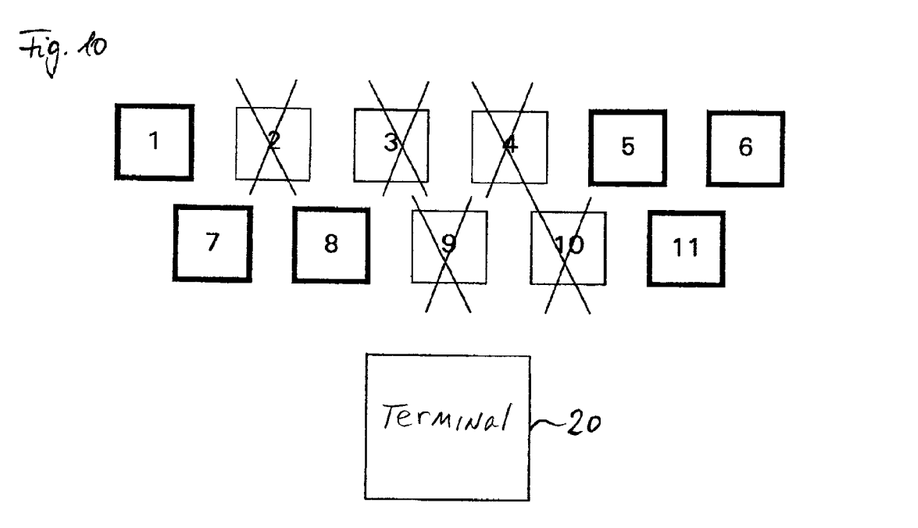

In the described manner, the non-critical satellite 4 is now also removed from the second subset and allocated to the first subset. The integrity risk for the remaining satellites 1, 5, 6, 7, 8 and 11 is determined again as well as whether the satellites continue to be critical satellites. In the embodiment, the number of critical satellites cannot be further reduced by the removal of the non-critical satellite 4, so that the second subset finally comprises satellites 1, 5, 6, 7, 8 and 11 which each are critical satellites. However, since the number of critical satellites in the embodiment no longer exceeds the number of maximally allowed critical satellites, the availability of the navigation system is ensured. In addition, the integrity risk is below the tolerable integrity risk.

As a result of the approach according to the invention, the availability of the navigation system as a whole has therefore been increased.

Figure 11:
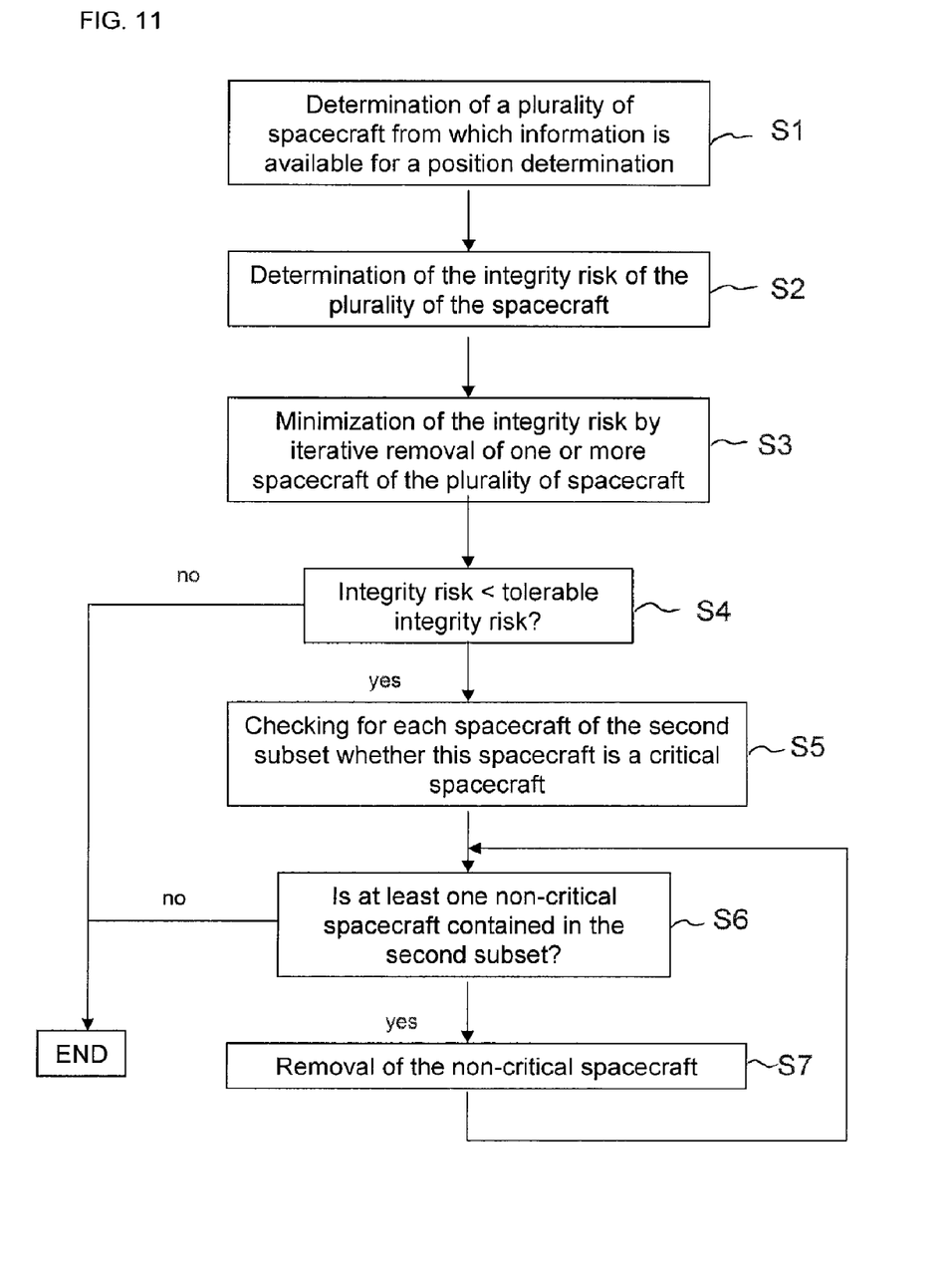
FIG. 11 is a flow chart that illustrates an example of the process according to the invention.

FIG. 11 is a flow chart that illustrates an example of the process according to the invention. In Step S1, a plurality of spacecraft is determined which provide information concerning a position determination. In Step S2, the integrity risk of the plurality of spacecraft is determined. This means that the integrity risk is determined for the total number of spacecraft that can be used for the position determination of a particular terminal. In a Step S3, the integrity risk is minimized by iterative removal of one or more spacecraft from the plurality of spacecraft. In Step S4, it is checked whether the determined integrity risk is lower than a tolerable integrity risk. If not, the optimization algorithm will end at this point. In the positive case, it is checked in Step S5 for each spacecraft of the second subset whether the latter is a critical spacecraft. If at least one non-critical spacecraft is contained in the second subset (Step S6), this spacecraft is removed from the second subset in Step S7. This takes place until no non-critical spacecraft is contained in the second subset. The optimization algorithm ends at this point.

By means of a targeted selection of available satellites for the position determination of a terminal, the availability of the global navigation system can be improved in a simple manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A process for increasing the availability of a global navigation system comprising a plurality of spacecraft, each of which transmits information for determining the position of a terminal, said method comprising:
   each of said spacecraft transmitting information to the terminal;
   from the plurality of spacecraft, determining a first subset including at least one of said spacecraft, and a second subset, with the second subset being constituted by those spacecraft that are not included in the first subset; and
   determining an integrity risk exclusively for the information transmitted by the second subset of spacecraft;
   wherein, the first and the second subsets of spacecraft are determined such that the integrity risk determined for the information transmitted by the second subset of spacecraft is optimized relative to the integrity risk that was determined for the information of all spacecraft included in the plurality of spacecraft.

2. The process according to claim 1, wherein only the information of the second subset of spacecraft is used for position determination of the terminal.

3. The process according to claim 1, wherein the information of the first subset of spacecraft is not used for position determination of the terminal.

4. The process according to claim 1, wherein the first and the second subsets of spacecraft are determined iteratively, so that the integrity risk determined for information transmitted by the second spacecraft is minimized relative to the integrity risk determined for the information of all spacecraft of the plurality of spacecraft.

5. The process according to claim 4, wherein, for minimizing the integrity risk:
   a) a number of spacecraft from the plurality of spacecraft is allocated to the first subset and the integrity risk of the spacecraft remaining in the second subset is determined;
   b) step a) is repeated for possible combinations of a first subset;
   c) those spacecraft of the second subset whose integrity risk is minimal form the plurality of spacecraft for a next iteration step,
   d) steps a) to c) are repeated until a minimal integrity risk has been reached.

6. The process according to claim 5, wherein it is checked whether the integrity risk is lower than a maximum tolerable integrity risk.

7. The process according to claim 6, wherein it is checked for each of the spacecraft of the second subset, whether it is a critical spacecraft.

8. The process according to claim 7, wherein it is checked whether the number of critical spacecraft is greater than a number of allowed critical spacecraft.

9. The process according to claim 7, wherein, for minimizing the number of critical spacecraft:
   a) a non-critical spacecraft from the determined second subset is allocated to the first subset;
   b) the number of critical spacecraft within the second subset is determined; and c) steps a) and b) are repeated iteratively until no non-critical spacecraft can be determined in the second subset.

10. The process according to claim 9, wherein minimizing of the number of critical spacecraft is carried out when the number of critical satellites is greater than a maximum permitted number of critical satellites.

11. A terminal for determining a position using a global navigation system comprising a plurality of spacecraft which, for position determination of the terminal, each transmit information to the terminal, the terminal comprising devices for implementing the process according to claim 1.

12. A computer program product which is loadable into the internal memory of a digital computer and comprises software sections for carrying out the steps according to claim 1, when the product is running on a computer.

* * * * *